United States Patent
Minervini

(10) Patent No.: US 9,133,959 B2
(45) Date of Patent: *Sep. 15, 2015

(54) VIRTUAL LIMIT SWITCH

(75) Inventor: Leo Minervini, Paramus, NJ (US)

(73) Assignee: Pentair Flow Services AG, Schaffhausen (CH)

( * ) Notice: Subject to any disclaimer, the term of this patent is extended or adjusted under 35 U.S.C. 154(b) by 186 days.

This patent is subject to a terminal disclaimer.

(21) Appl. No.: 13/606,499

(22) Filed: Sep. 7, 2012

(65) Prior Publication Data

US 2014/0069508 A1    Mar. 13, 2014

(51) Int. Cl.
G08B 21/00 (2006.01)
F16K 37/00 (2006.01)

(52) U.S. Cl.
CPC ....... *F16K 37/0091* (2013.01); *Y10T 137/0324* (2015.04)

(58) Field of Classification Search
CPC ......... E21B 47/14; E21B 47/16; E21B 47/18; F16K 37/0091
USPC .............. 340/540, 626, 686.1; 700/282, 289; 702/45
See application file for complete search history.

(56) References Cited

U.S. PATENT DOCUMENTS

| | | | |
|---|---|---|---|
| 6,272,401 B1 * | 8/2001 | Boger et al. | 700/282 |
| 6,920,409 B2 * | 7/2005 | Essam | 702/114 |
| 7,086,358 B2 | 8/2006 | Panciroli | |
| 7,318,350 B2 * | 1/2008 | Boken | 73/587 |
| 7,335,161 B2 * | 2/2008 | Von Arx et al. | 600/485 |
| 7,647,940 B2 | 1/2010 | Minervini et al. | |
| 7,693,606 B2 | 4/2010 | Ahmad et al. | |
| 8,265,794 B2 * | 9/2012 | Minervini et al. | 700/282 |
| 2001/0037159 A1 | 11/2001 | Boger et al. | |
| 2002/0198668 A1 * | 12/2002 | Lull et al. | 702/45 |
| 2005/0189017 A1 * | 9/2005 | Eryurek | 137/487.5 |
| 2006/0052904 A1 * | 3/2006 | Brodeur et al. | 700/282 |
| 2008/0004836 A1 * | 1/2008 | Tewes et al. | 702/182 |
| 2009/0088906 A1 | 4/2009 | Minervini et al. | |
| 2009/0292399 A1 | 11/2009 | Nagase et al. | |
| 2011/0083859 A1 * | 4/2011 | Scranton et al. | 166/374 |
| 2012/0139725 A1 * | 6/2012 | Grumstrup | 340/540 |

* cited by examiner

*Primary Examiner* — Thomas Mullen

(74) *Attorney, Agent, or Firm* — Quarles & Brady LLP

(57) ABSTRACT

A method associated with a valve package having a process valve, an actuator and a controller. The method includes obtaining a baseline signature corresponding to opening or closing the valve as the valve moves from a first position to a second position. The method also includes obtaining an operating signature corresponding to values associated with the baseline signature each time the valve moves from the first position to the second position. In addition, the operating signature is compared to the baseline signature. The method further includes determining if one or more of the values associated with the operating signature is within an acceptable range from the corresponding one or more values in the baseline signature.

14 Claims, 6 Drawing Sheets

VIRTUAL LIMIT SWITCH

FIELD OF THE INVENTION

This invention relates to a valve used in a process, and more particularly, to a method for determining whether the valve is closed or open without the use of a limit switch or a position sensor.

BACKGROUND OF THE INVENTION

Process valves are used in the chemical, pharmaceutical, food and other industries to control or regulate fluid flow. It is desirable to monitor the operational state of a valve, such as whether the valve is opened, partially opened or closed, to ensure that a particular process or activity is actually being performed. One method for monitoring the operational state of a valve is through the use of a valve position sensor such as a limit switch.

Many industries utilize valve islands or manifolds that include a group of valves, such as pneumatic valves, that are mounted on a common base. Such islands typically include an electrical connection and a pneumatic connection for providing electricity and supply air in order to operate the valves in the valve island. An advantage of a valve island is that the island may be expanded by incrementally adding valve stations as needed for a particular process or facility. However, a limit switch is not used in many single valve and valve island configurations for various reasons. A reason is the relatively high cost associated with installation and maintenance of the limit switches. For example, it may be difficult to install electrical wiring for a limit switch that is remotely located in a facility. As a result, it is difficult to remotely monitor the operational state of the valves in the valve island.

SUMMARY OF THE INVENTION

A method associated with a valve package having a process valve, an actuator and a controller. The method includes obtaining a baseline signature corresponding to opening or closing the valve as the valve moves from a first position to a second position. The method also includes obtaining an operating signature corresponding to values associated with the baseline signature each time the valve moves from the first position to the second position. In addition, the operating signature is compared to the baseline signature. The method further includes determining if one or more of the values associated with the operating signature is within an acceptable range from the corresponding one or more values in the baseline signature.

DESCRIPTION OF THE INVENTION

Figure 1:
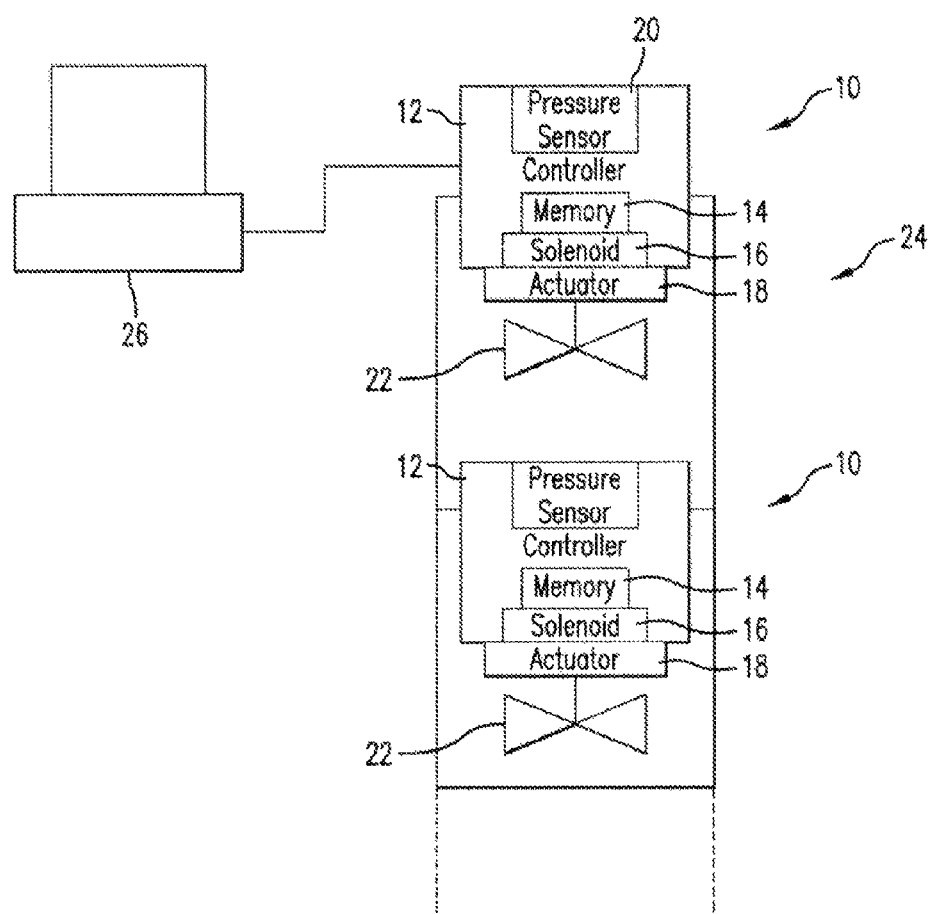
FIG. 1 depicts a valve package.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings. In the description below, like reference numerals and labels are used to describe the same, similar or corresponding parts in the several views of FIGS. 1-6. In addition, the disclosure of U.S. Patent Publication No. 2009/0088906A1 (U.S. application Ser. No. 12/236,680) published on Apr. 2, 2009 entitled KNOWLEDGE BASED VALVE CONTROL METHOD and that of U.S. Pat. No. 7,647,940 issued on Jan. 19, 2010 entitled DEVICE AND METHOD FOR PNEUMATIC VALVE CONTROL are herein incorporated by reference in their entirety.

Referring to FIG. 1, a valve package 10 typically includes controller 12, memory 14, solenoid 16, actuator 18, pressure sensor 20 and process valve 22. Valve 22 is installed in a process pipeline to allow, restrict or prevent process media flowing through the valve 22. The actuator 18 is mounted on valve 22 and is typically pneumatically actuated, but may also be electric or hydraulic. A number of different types of actuators may be used to open/close particular types of valves. For example, a linear actuator may be used to open/close a diaphragm valve; a rotary actuator may be used to open/close a butterfly or ball valve. The actuator 18 may include an output shaft that is connected to a valve stem having a disc or other moveable valve member. The output shaft either rotates or lifts upward (depending on the valve type) to provide the necessary torque to turn or lift the valve stem in order to either move the valve member toward the valve seat until contact is made with the valve seat to close the valve or move the valve member away from the valve seat to open the valve 22. The controller 12 is configured to control the actuator 18 based on various input signals. The controller 12 further includes the capability to monitor valve operation and signal an error message if a failure condition occurs. The time it takes the valve 22 to open and close depends on the type and size of the valve 22, the torque rating of the actuator 18, the configuration of the valve seat and other parameters. The valve package 10 may be part of a valve island 24 having plurality of valve packages 10. Alternatively, a valve package 10 may be configured as a standalone item. A programmable computer 26 may be used to provide instructions to the controller 12 for operating the valve package 10.

Figure 2:
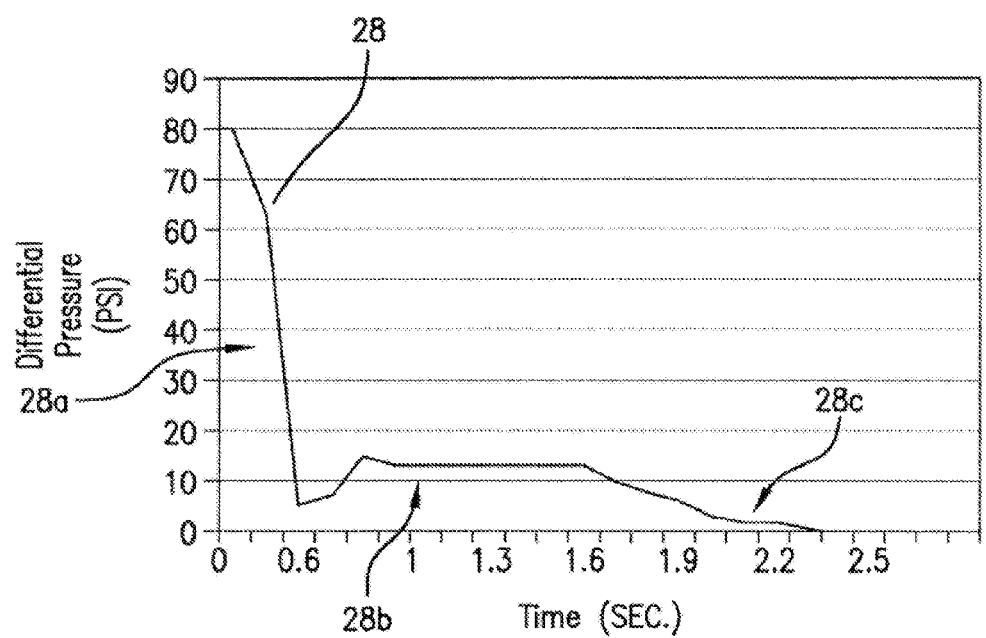
FIG. 2 illustrates an exemplary baseline signature of differential pressure vs. time for the valve package.

FIG. 2 illustrates an exemplary baseline signature 28 of differential pressure vs. time for a valve package 10 having a spring return actuator. In particular, FIG. 2 depicts a baseline signature 28 for closing the valve 22. It is understood that the following description also applies to a baseline signature for opening the valve 22. The differential pressure is the pressure between a supply pressure and a port of the spring return actuator. The pressure at time t=0 corresponds to the pressure when the valve 22 is open and prior to closing the valve 22 wherein a maximum differential pressure of approximately 80 psi is available to close the valve 22. When the controller 12 transmits a command to the actuator 18 to close the valve 22, the differential pressure steadily decreases from approximately 80 psi to 5 psi after approximately 0.5 seconds in a first section 28a of the baseline signature 28, thus exhausting a substantial amount of pressure in order for the valve member to overcome inertia and friction to break away from the open position. From approximately 0.9 seconds to 1.7 seconds, the differential pressure is relatively flat at approximately 13 psi in a second section 28b of the baseline signature 28, thus indicating a slew time wherein the valve member is moving to the closed position. From approximately 1.7 seconds to 2.4 seconds the differential pressure is gradually reduced to zero in a third section 28c of the baseline signature 28, thus indicating that the valve member is moving into the valve seat and the valve 22 is consequently closed.

Figure 3:
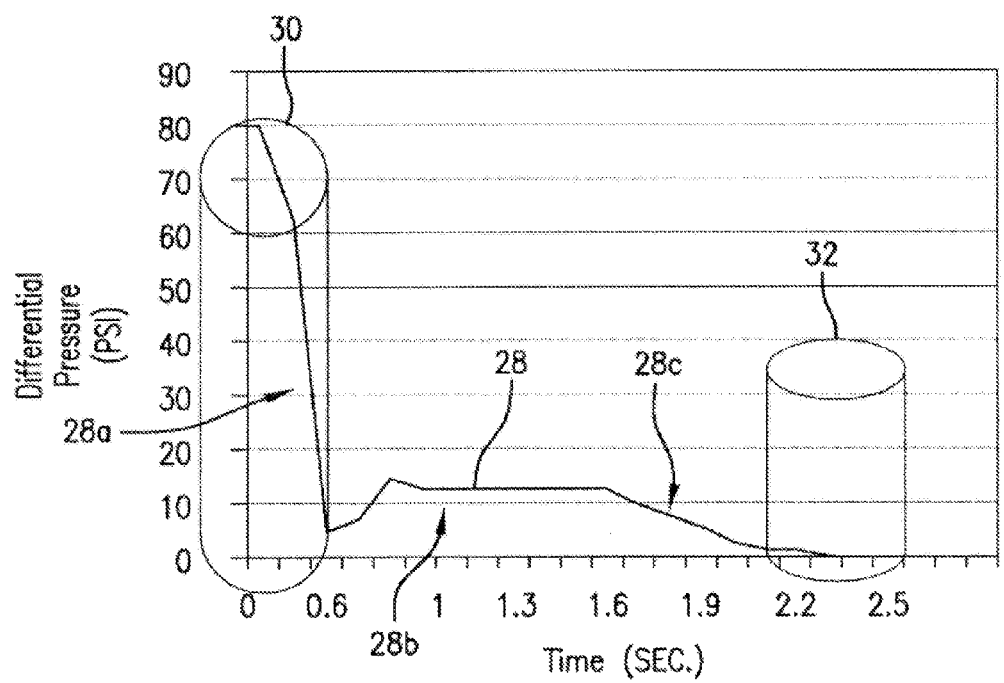
FIG. 3 depicts exemplary acceptable ranges for differential pressure and time for portions of the baseline signature.

Valves frequently exhibit varying levels of hysteresis when opening and closing, for example. For certain applications, it has been determined that deviations from the baseline signature 28, due to hysteresis, which are within a predetermined range for differential pressure and time are acceptable. The acceptable deviation may be based on a percentage of the baseline signature 28 and may be user defined. Referring to FIG. 3, exemplary acceptable ranges for differential pressure and time for portions of the baseline signature 28 are shown. In particular, FIG. 3 depicts a first acceptable range 30 for differential pressure and time for the first section 28a of the baseline signature 28 (i.e. when the valve member begins to move from the open position). Thus, in accordance with the first acceptable range 30, if the differential pressure decreases from approximately 80 psi to 5 psi within approximately 0.5 seconds when the valve member begins to move from the open position, then no valve malfunction has occurred. FIG. 3 also depicts a second acceptable range 32 for the third section 28c of the baseline signature 28 (i.e. when the valve member is moving into the valve seat and consequently the valve 22 is closed). In accordance with the invention, the baseline signature 28 and the first 30 and second 32 acceptable ranges establish the parameters for determining whether the valve 22 is closed. Further, the determination of whether the valve 22 is closed is accomplished without the use of a limit switch. Thus, if the operational signature does not occur in the second acceptable range 32, this indicates that the valve 22 is not closed.

Figure 4:
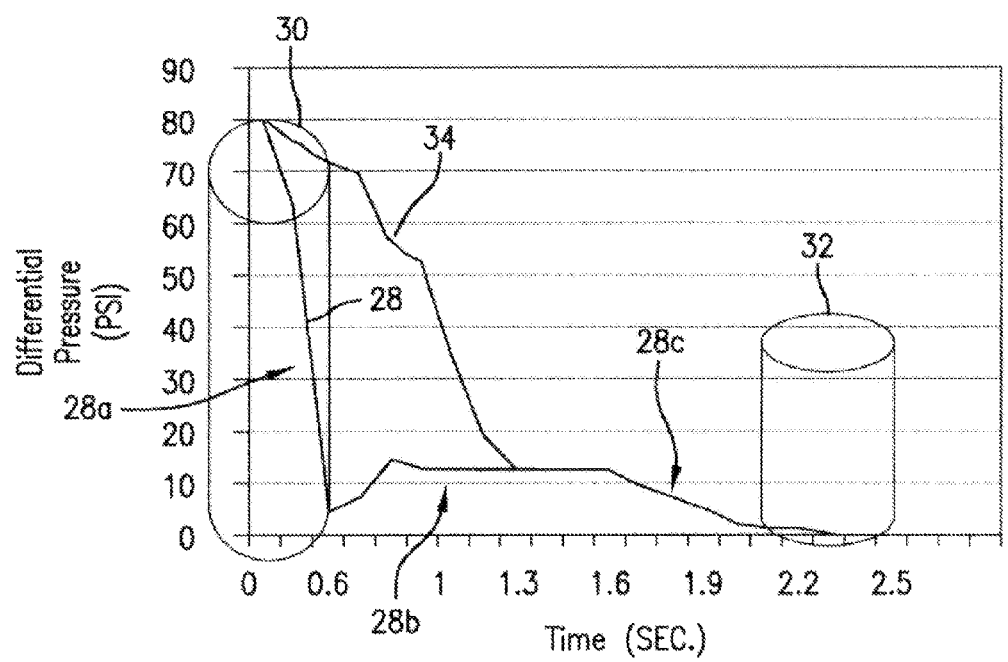
FIG. 4 depicts an exemplary first deviation from the baseline signature which exceeds a first acceptable range.

During use, operational signatures are generated each time a valve is commanded to close. Any operational signatures having a differential pressure or time value that falls outside of the first 30 and second 28 acceptable ranges indicates a possible valve malfunction. Referring to FIG. 4, an exemplary first deviation 34 from the baseline signature 28 which occurred during use and is outside of the first acceptable range 30, is shown. In FIG. 4, it can be seen that the differential pressure decreased from approximately 80 psi to 13 psi in approximately 1.3-1.4 seconds during first deviation 34, in contrast to approximately 80 psi to 5 psi after approximately 0.5 seconds in accordance with the first section 28a of the baseline signature 28, thus reducing the amount of slew time in second section 28b. The remaining portions of FIG. 4 complied with the baseline signature 28 thus indicating that the valve 22 still closed even though a deviation from the baseline signature 28 occurred elsewhere.

It is desirable to compare each operational signature with the baseline signature 28 in order to ascertain whether the valve 22 is operating within acceptable ranges or whether there is a possible valve malfunction. A plurality of operational signatures may be stored in memory 14 and are then each compared with the baseline signature 28. The operational signatures may be stored in memory 14 based on a first-in first-out (i.e. "FIFO") method depending on the type of application and memory size. In particular, the memory 14 stores a predetermined number of operational signatures wherein the first stored operational signature is replaced by a newly generated operational signature on a continual basis as new operating signatures are generated. If one or more of the operational signatures is not within the first 30 and second 32 acceptable ranges, an alarm is generated and the non-compliant signature is locked in memory 14 with a date and time stamp. As such, the current invention provides information regarding the condition of the valve 22 during operation of valve 22 which may then be used as part of a condition based or predictive maintenance program. The number of operational signatures stored in memory 14 may vary by application. In one embodiment, four operational signatures are stored.

Figure 5:
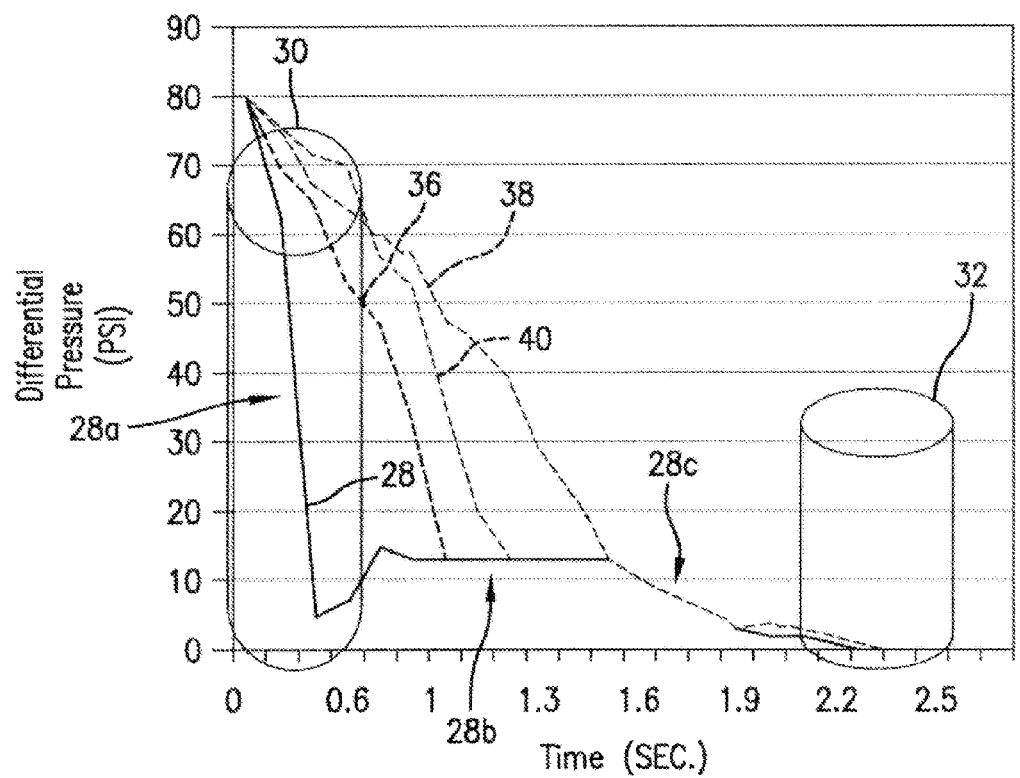
FIG. 5 depicts second, third and fourth exemplary deviations from the baseline signature 28 which exceed the first acceptable range.

Referring to FIG. 5, second 36, third 38 and fourth 40 exemplary deviations from the baseline signature 28 which are outside of the first acceptable range 30 is shown. In FIG. 5, it can be seen that second 36, third 38 and fourth 40 deviations occurred during the first section 28a. The second 36, third 38 and fourth 40 exemplary deviations may be designated as FIFO deviations stored in memory 14. The remaining portions of FIG. 5 complied with the baseline signature 28 thus indicating that the valve 22 still closed even though deviations from the baseline signature 28 occurred elsewhere.

Figure 6:
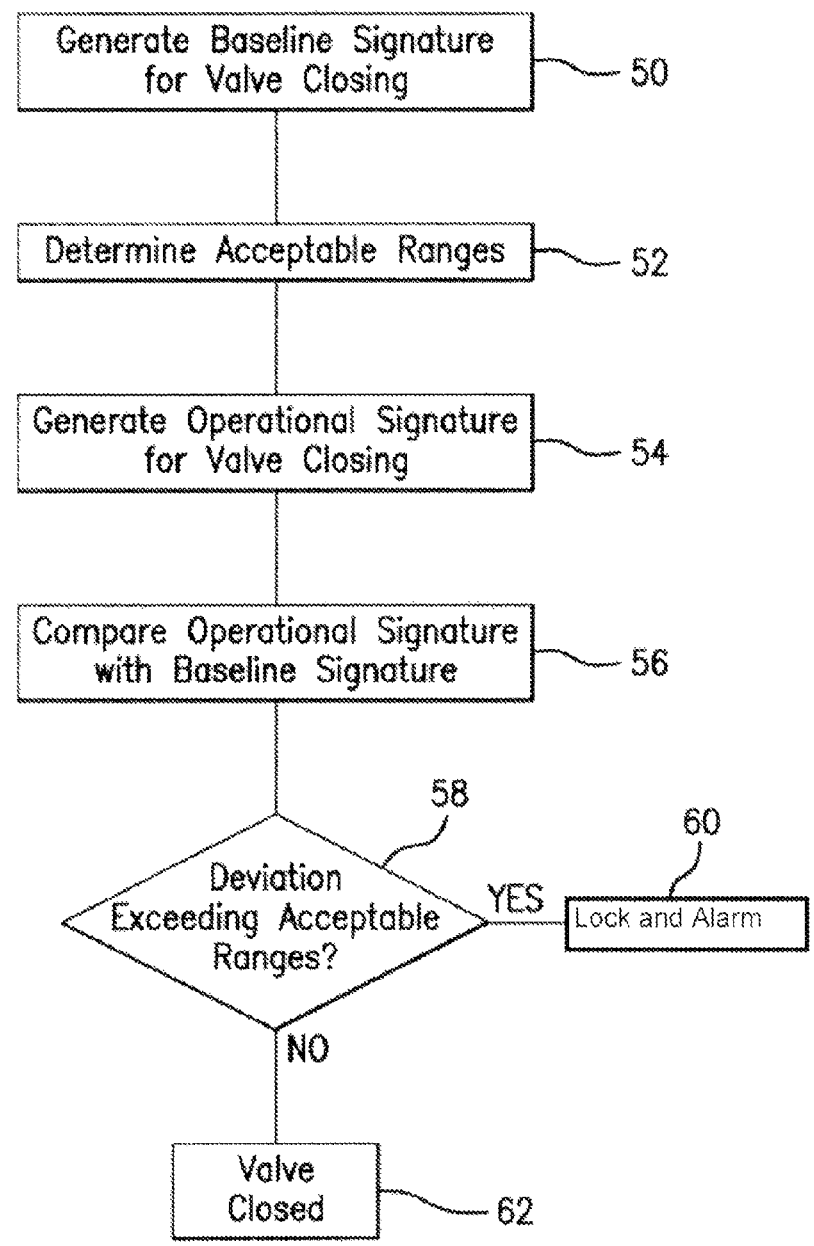
FIG. 6 depicts a flowchart illustrating an exemplary operation of the valve package of claim 1.

Referring to FIG. 6, a flowchart in accordance with the current invention is shown. At step 50, a baseline signature 28 of pressure vs. time is generated for a valve 22 which does not include a limit switch. At step 52, the first 30 and second 32 acceptable ranges for the first 28a and third 28c sections of the baseline signature 28 are determined. At step 54, an operational signature for the valve 22 is generated. At step 56, the operational signature is compared with the baseline signature 28 and the first 30 and second 32 acceptable ranges. At step 58, a determination is made as to whether there is a deviation with respect to the first 30 and second 32 acceptable ranges. If a deviation has occurred, an alarm is generated and the non-compliant signature is locked in memory with a date and time stamp at step 60. If no deviation has occurred, then the valve 22 is determined to be closed at step 62. Therefore, the current invention enables determination of whether the valve 22 is closed based on whether the valve signature 28 exceeds the first 30 and second 32 acceptable ranges and is accomplished without the use of a limit switch.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations.

What is claimed is:

1. A method associated with a valve package having a process valve, an actuator and a controller, the method comprising:
   obtaining a baseline signature corresponding to moving the valve from a first position to a second position and including a first baseline section, a second baseline section, and a third baseline section;
   obtaining a plurality of operating signatures associated with the baseline signature and each obtained operating signature including a first operating section, a second operating section, and a third operating section, a single operating signature of the plurality of operating signatures obtained each time the valve moves from the first position to the second position;

comparing each obtained operating signature to the baseline signature;

determining if the first operating section of each obtained operating signature is within a first acceptable range from the first baseline section; and determining if the third operating section of each obtained operating signature is within a second acceptable range from the third baseline section.

2. The method according to claim 1 further comprising triggering an alarm notification when either the first operating section of one of the plurality of obtained operating signatures is not within the first acceptable range from the first baseline section or the third operating section of one of the plurality of obtained operating signatures is not within the second acceptable range from the third baseline section.

3. The method according to claim 1 wherein one or more of the plurality of operating signatures is stored in memory each time the valve moves from the first position to the second position.

4. The method according to claim 3 wherein the one or more of the plurality of operating signatures are stored in memory in accordance with a first-in, first-out method.

5. The method according to claim 4 wherein four operating signatures are stored.

6. The method according to claim 1 wherein the baseline signature and the plurality of operating signatures represent measured values of differential pressure and time.

7. The method according to claim 6 wherein the first acceptable range includes a differential pressure range of approximately 80 psi to 5 psi and a time range of approximately 0.5 seconds.

8. The method according to claim 1 wherein the baseline signature corresponds to closing the valve and in the first baseline section differential pressure is exhausted, the second baseline section includes a slew time wherein the valve is closing, and in the third baseline section the valve is moving into a valve seat and subsequently closed.

9. A method associated with a valve package having a process valve, an actuator and a controller, the method comprising:

obtaining a baseline signature corresponding to moving the valve from a first position to a second position and including a first baseline section, a second baseline section, and a third baseline section;

obtaining a plurality of operating signatures associated with the baseline signature value and each obtained operating signature including a first operating section, a second operating section, and a third operating section, a single operating signature of the plurality of operating signatures obtained each time the valve moves from the first position to the second position;

storing each obtained operating signature in memory in accordance with a first-in, first-out method;

comparing each obtained operating signature to the baseline signature;

determining if the first operating section of each obtained operating signature is within a first acceptable range from the first baseline section;

determining if the third operating section of each obtained operating signature is within a second acceptable range from the third baseline section; and locking an obtained operating signature if either the first operating range of the obtained operating signature is not within the first acceptable range from the first baseline section or the third operating range of the obtained operating signature is not within the second acceptable range from the third baseline section.

10. The method according to claim 9 further comprising triggering an alarm notification when either the first operating section of one of the plurality of obtained operating signatures is not within the first acceptable range from the first baseline section or the third operating section of one of the plurality of obtained operating signatures is not within the second acceptable range from the third baseline section.

11. The method according to claim 9 wherein four operating signatures are stored.

12. The method according to claim 9 wherein the baseline signature and the plurality of operating signatures represent measured values of differential pressure and time.

13. The method according to claim 12 wherein the first acceptable range includes a differential pressure range of approximately 80 psi to 5 psi and a time range of approximately 0.5 seconds.

14. The method according to claim 9 wherein the baseline signature corresponds to closing the valve and in the first baseline section differential pressure is exhausted, the second baseline section includes a slew time wherein the valve is closing, and in the third baseline section the valve is moving into a valve seat and subsequently closed.

\* \* \* \* \*